Feb. 19, 1935. H. T. WHEELER 1,991,714
PLASTIC PACKING STUFFING BOX
Filed Dec. 15, 1930 2 Sheets-Sheet 1

INVENTOR.
Harley T Wheeler

Feb. 19, 1935.     H. T. WHEELER     1,991,714
PLASTIC PACKING STUFFING BOX
Filed Dec. 15, 1930     2 Sheets-Sheet 2

INVENTOR.
Harley T Wheeler

Patented Feb. 19, 1935

1,991,714

UNITED STATES PATENT OFFICE 1,991,714

PLASTIC PACKING STUFFING BOX

Harley T. Wheeler, Dallas, Tex.

Application December 15, 1930, Serial No. 502,450

5 Claims. (Cl. 286—38)

This invention relates to certain improvements in rod packing, more especially to that class in which the rod or stem moves nearly on its mechanical center and its chief advantage lies in its capability of forming perfect self-setting plastic packing rings within the stuffing-box by external means, without stopping the machine.

This invention further consists of a means of withdrawing any desired amount of the packing which has been worn, without cessation of operation.

A further advantage is the arrangement of cone-shaped flexible packing rings at each end of the box, so arranged to effectively prevent leakage of the plastic packing while the latter is being injected under pressure.

A still further advantage is that the admission ports for the plastic packing do not interfere with the profile of contact of the plastic rings.

A still further and important advantage is that the plastic rings may be made in the shape of cones which are automatically maintained in tight contact with the rod by pressure from the machine chamber, this action controlling the density of the plastic material.

With these advantages in view, further objects and advantages of construction will be brought forth as the description proceeds, accompanied by the drawings, wherein.

Figure 1:
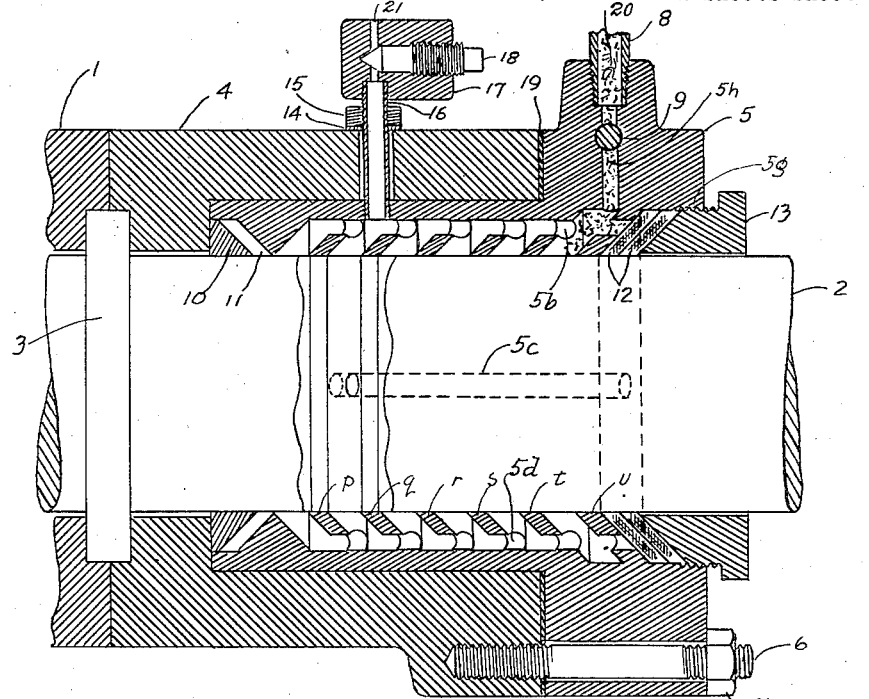
Figure 1 is a cross-section of a stuffing-box plastic sleeve, made according to this invention.

Referring now especially to Figure 1, representing a rotating, non-rising gate valve stem, the body 1 containing the valve discs and operating screw, it not being necessary to show the latter parts. The stuffing-box housing 4 is attached to body 1, the stem 2 passing thru the assembly and a collar 4 positioning the stem 2 from lengthwise motion. The plastic sleeve container 5, made according to this invention, is attached to the housing 4 by the studs 6 and nuts 7. A gasket 19 closes the joint between the sleeve 5 and the housing 4.

Figure 2:
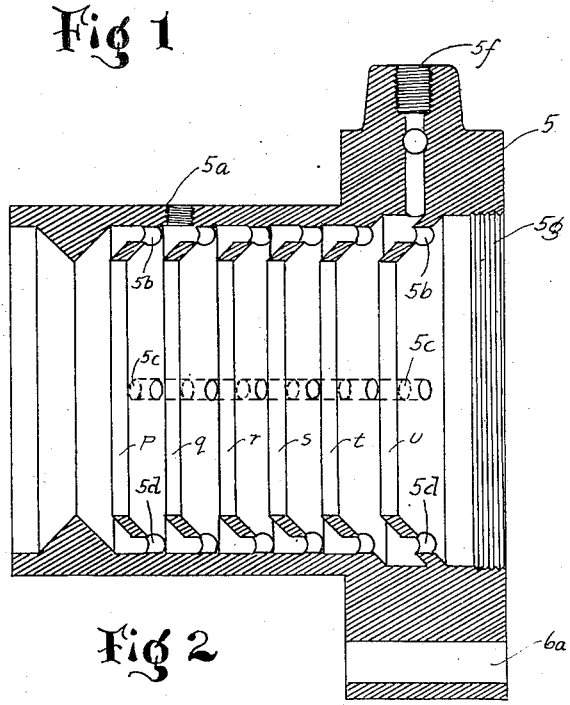
Figure 2 is the cross-section of the plastic sleeve, without any accessories.

Before completing the description of the packing assembly, attention is now directed to Figure 2, an end cross-section of the plastic sleeve 5. As herein shown this is a solid piece, the necessary openings and passages being machined or cored; this design however, is not intended to limit the scope of any design that may be necessary for a local condition. The ribs, p, q, r, s, t and u are left as a part of the main body 5 and in this design are made at an angle of 45 degrees with the center line of the sleeve 5. The annular spaces machined out, formed by the surfaces of the aforesaid ribs, are concentric with the main bore of the sleeve 5. The surfaces of adjacent ribs therefore form spaces, which being further limited by the surface of the rod, make it possible to form cone-shaped rings of plastic packing. The cone shape is herein shown as it is more efficient for packing purposes than a radial-walled annular space, altho the latter shape is included in the scope of this invention.

Figure 3:
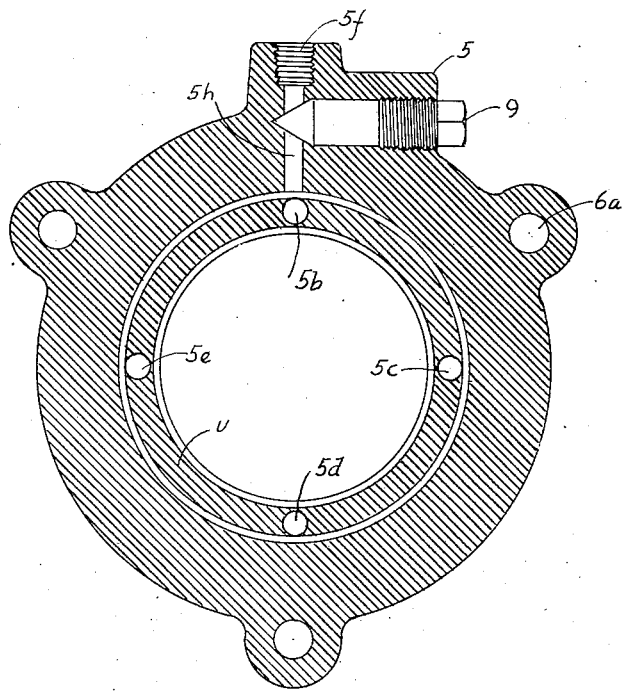
Figure 3 is an end view in cross-section of the plastic sleeve, showing method and point of injection.

Attention is now directed to Figure 3, an end view of the plastic sleeve 5, this cross-section being made thru the centerline of the injection port 5f. The rib u, being here shown on an angle, is cut thru from one side to the other. Passages 5b, 5c, 5d and 5e are made parallel to the bore of sleeve 5 and pass thru ribs u, t, s, r, q and p, the surfaces of said passages being made tangent to the outside surface of each annular space, as may be discerned by referring to Figure 2. Thus the intercommunicating passages do not intersect the bored surface of the sleeve 5, but are inside and away from the bearing surfaces of the plastic cones and their contact with the rod.

To return to Figure 3: the injection port 5f is threaded for attachment to any external means for injecting the plastic material by pressure and is continued by passage 5h into the annular space between ribs t and u. A needle valve 9 is threaded into a suitable boss on the side of the sleeve 5 and the former is used to open or close the passage 5h. The threaded hole 5a is a vent for old packing, which will later be shown to be connected to the outside. Several holes 6a accommodate the studs 6 which are used to fasten the plastic sleeve 5 to the housing 4, and as shown in Figure 1.

Returning now to the latter figure to complete the description of the packing assembly. Before inserting the sleeve 5 into the stuffing-box a flexible cone-shaped packing ring 11 is inserted into the inside end of sleeve 5 and followed by a correspondingly shaped thrust collar 10 which extends sufficiently to strike the bottom of the stuffing-box and by so doing to compress the ring 11. Against the outer face of rib u is inserted the cone-shaped fabric packing rings 12, held in place by a correspondingly shaped thrust gland 13, screwed into the thread 5g. Thru an opening in the housing 4 is inserted a pipe 16, screwed into the sleeve 5 at opening 5a. The pipe 16 is held pressure tight against the housing 4 by a nut 15 being compressed against the washer 14. The valve housing 17, containing a needle valve 18, is attached to the pipe 16. The needle valve 18 opens or closes the passage 21, the latter being a thru passage to sleeve 5, entering between ribs p and q. The pipe 8 is the means to connect some source of plastic material supply under pressure to the passages of sleeve 5, thru the port 5f.

Figure 4:
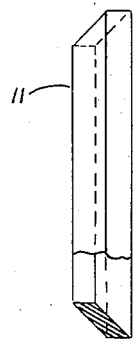
Figure 4 is the type of end retainer, a flexible self-setting ring.

Figure 4 is a partial cross-section showing the construction of the flexible packing ring 11. The rings 12 are similar.

Figure 5:
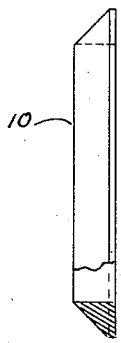
Figure 5 is the type of end thrust collar.

Figure 5 is a partial cross-section showing the construction of the thrust collar 10. Collar 13 is similar, being different only that it is threaded into the sleeve 5 by threads 5g.

The form of this invention is a useful variation of a patent I have previously applied for and this design is particularly adapted for high pressures under which the packing surface must fit the rod accurately and in a certain manner. Friction against the packing or change of pressure can vary the density of the plastic packing and move it in but one line only, parallel to the centerline of the rod. Thus each chamber containing plastic material has all points of contact between the packing and the rod in a plane which is perpendicular with the rod surface. The intercommunicating passages between compartments do not intersect the points of contact between the packing and the rod. Thus a flow of plastic material may be secured from one annular space to another, the contact of each packing ring being undisturbed, while the rod is at rest or in motion.

Referring now to my application for Letters Patent, Serial Number 533,430, dated April 28, 1931, the seventh law of friction which states:

7. "Friction is inversely proportional to the rate of seepage flow at the surface of contact between a solid moving body and a porous elastic structure, up to the point of saturation."

Interpreted for plastic packing the foregoing means that unless seepage under pressure can flow thru the packing, the friction will rise due to the tendency to occupy a larger volume.

The usual method of using plastic is to force the material into grooves or reservoirs, the fact that a dense body having fines, pores and interstices will become highly saturated being overlooked. Plastic materials trap the pressure and unless the material is in thin sections and intercommunication established from one section to another, the pressure cannot drop uniformly which results in blowing the material out at the points of greatest pressure drop. In Figure 3, the passages 5a, b, c, and d illustrate the method of using a series of passages performing two services; first, the distribution of the injected material, and second, providing passages for seepage flow. The passages eliminate the chief obstacle to the use of plastic materials in grooves, as they are sufficient in number and area to maintain a low saturation. Friction does not become excessive nor can pressure build up at concentrated points and blow the plastic materials out along the rod.

To place a sleeve of this design in operation, the stuffing-box and gasketing surfaces are cleaned, then the flexible ring 11 is inserted in the sleeve 5 and held in place by the thrust collar 10. The collar 10 is made to extend sufficiently to strike the bottom of the stuffing-box, thereby compressing the ring 11. Liquids or gases may pass under the ring 11 in an outward direction, but any plastic material being forced into the passages will collapse the cone-shaped ring 11 against the rod 2 and prevent any escape of the plastic material 20.

After the sleeve 5 is pulled into place by the studs 6 and nuts 7, the gasket joint 19 being made tight thereby, any pressure from the inside is free to flow outwardly. Thus one of the great difficulties of forcing packing into a stuffing-box against pressure is eliminated by this invention. For example, a stream of liquid is flowing thru the sleeve 5 after the latter has been tightened to place; the needle valve 9 is now opened, then the flexible rings 12 are inserted and brought to place by the thrust collar 13. The liquid escaping thru the sleeve 5 will be vented to atmosphere thru the passage 5h; the packing sleeve 5 is in place and yet no stress has been placed on the stuffing-box, nor has any pressure been overcome to get the sleeve 5 into place.

At this point of the installation a gun or other means for raising pressure of the plastic material is attached by the pipe 8. Any leakage now will accumulate against the rings 12, so needle valve 18 may be opened to by-pass the pressure until the plastic material 20 begins to fill the box, as shown in Figure 1. After the plastic fills the grooves up to the passage and opening 5a, the needle valve 18 must be closed to prevent wasting the packing to the outside. Accumulated pressure will now be held by the plastic material in the annular spaces and the remaining passages may be filled until the plastic contacts with the flexible ring 11, the pressure at this point rising so that the operator knows that the operation is complete. Needle valve 9 is closed and the source of pressure disconnected. The pressure from the valve chamber now continuously collapses each annular plastic ring against the rod, as plastic under pressure acts very much like fabrics in this respect.

After the stem is operated for some time, the plastic packing will shrink and some will be washed along the stem. But the advantage of this form is that the face of the packing exposed to the pressure will recede and remain perpendicular to the direction of pressure, being so equalized by the walls of the annular spaces and intercommunication of the passage holes 5b, 5c, 5d and 5e.

Should the inside rings harden or absorb grit and dirt, or for any reason it is advisable to vent the inner rings, a definite amount of plastic packing, as represented by the rings between ribs q and p may be blown out by opening needle valve 18. The outer packing rings will not be disturbed by so doing, then the source of supply can again be connected by pipe 8 and the packing advanced to the last groove. If it is desirable to clean the whole box, needle valve 9 may be opened, or the sleeve can be removed.

A particular advantage of this invention is that during the manufacture of valves they may be put through a hydrostatic pressure test by placing one of these sleeves in the stuffing-box during the test, then removing the sleeve without disturbing the packing in place in the annular grooves. Then the same sleeve may be used to test any number of similar sized valves, thus saving the present waste of cutting packing for every box.

While the method of injection has been shown at one point, and thru intercommunicating passages provided from one annular groove to another, it is within the scope and intention of the invention to fill or vent each annular space separately, in pairs, or in any number of combinations that may be necessary.

It is believed that the objects and advantages of this invention have a wide application and to be an improvement over the present systems of plastic packing; such improvements that are within the spirit of this invention I do hereby claim by the attached claims.

I claim:

1. A stuffing box formed around a rod with a clearance for the movement of said rod and subjected to a fluid medium under pressure, an annular groove formed in the wall of said stuffing box and adapted to receive plastic materials, the walls of said groove being inclined toward the rod and toward the source of fluid pressure, a flexible absorbent fibrous packing ring confined in the inner end of said stuffing box, said packing ring being frusto-conical in shape with its smaller end presented outwardly away from the source of said fluid medium, and contiguous flexible cone-shaped packing rings positioned at the outer portion of said stuffing box, their smaller ends being presented toward the source of said pressure, said annular groove being situated between said inner and outer cone-shaped packing rings.

2. In a stuffing box formed around a rod with a clearance for the movement of said rod and subjected to a fluid medium under pressure, a series of adjacent annular grooves formed in the wall of said stuffing box having the sides of said grooves inclined from said wall inwardly toward the source of said fluid medium, said annular grooves being adapted to receive plastic packing materials, means through which to force packing material into said grooves, a flexible cone-shaped fibrous packing ring confined in the bottom of said stuffing box, its smaller end inclining away from the source of said pressure, opposed flexible cone-shaped fibrous packing rings positioned at the outer portion of said stuffing box, their smaller ends inclined toward the source of said pressure, said annular grooves being situated between said inner and outer cone-shaped packing rings, said plastic packing material having contact with the inner face of one of said outer packing rings between its margins.

3. In a stuffing box formed around a rod with a clearance for the movement of said rod and saturated by a fluid medium under pressure, a series of separating walls disposed in said stuffing box, said walls each having an outer convex surface and an inner concave surface, forming between said walls a series of adjacent annular grooves, a plurality of intercommunicating passages formed in each of said walls, there being an opening into said grooves through which may be injected plastic materials to flow through said intercommunicating passages into said annular grooves to form a multiplicity of conical packing rings in contact with said rod, flexible packing rings disposed at the inner and outer ends of said stuffing box to prevent the escape of said plastic materials, said packing rings being frusto-conical and having their smaller ends presented toward the interior of said stuffing box.

4. In a stuffing box formed around a rod with a clearance for the movement of said rod, said box having a series of interconnected annular grooves, plastic material to form a series of simultaneously-acting mutually dependent plastic conically-shaped packing rings around said rod within said grooves, and means to prevent the escape of said plastic materials from the ends of said stuffing box, a passage to a lower pressure level spaced from said means and connected with one of said annular grooves so that the plastic material between said passage and the source of said pressure may be discharged through said passage by said pressure without interfering with the plastic materials contained in the remaining annular grooves, and means to normally close said passage.

5. In a stuffing box formed around a rod and saturated by a fluid medium under pressure and having a series of adjacent conically-shaped plastic packing units, the method of packing, comprising forcing plastic packing material under uniform pressure into said units, directing said packing in a direction inclined toward the source of said fluid medium sealing against the escape of said plastic packing, and removing a portion of said packing at a point remote from the point of entrance, at intervals to admit a further supply of fresh plastic material.

HARLEY T. WHEELER.